US009400336B2

(12) United States Patent
Berruyer

(10) Patent No.: US 9,400,336 B2
(45) Date of Patent: Jul. 26, 2016

(54) PHOTONIC SPECTROMETRY DEVICE AND METHOD, METHOD FOR CALIBRATING THE DEVICE, AND USE OF THE DEVICE

(75) Inventor: Eric Berruyer, Loriol sur Drome (FR)

(73) Assignee: AREVA NP, Courbevoie (FR)

( * ) Notice: Subject to any disclaimer, the term of this patent is extended or adjusted under 35 U.S.C. 154(b) by 0 days.

(21) Appl. No.: 14/005,000

(22) PCT Filed: Mar. 12, 2012

(86) PCT No.: PCT/EP2012/054256
§ 371 (c)(1),
(2), (4) Date: Sep. 13, 2013

(87) PCT Pub. No.: WO2012/123404
PCT Pub. Date: Sep. 20, 2012

(65) Prior Publication Data
US 2014/0003579 A1 Jan. 2, 2014

(30) Foreign Application Priority Data
Mar. 14, 2011 (FR) ...................................... 11 52069

(51) Int. Cl.
*G01T 1/36* (2006.01)
*G01T 1/40* (2006.01)

(52) U.S. Cl.
CPC . *G01T 1/36* (2013.01); *G01T 1/362* (2013.01); *G01T 1/40* (2013.01)

(58) Field of Classification Search
CPC .......................................................... G01T 1/36
USPC ...................................................... 250/252.1
See application file for complete search history.

(56) References Cited

U.S. PATENT DOCUMENTS 3,009,062 A 11/1961 Brooksbank, Jr. et al.
3,124,679 A 3/1964 Tittman et al.
(Continued)

FOREIGN PATENT DOCUMENTS

CN 101470207 A 7/2009
EP 0256902 A2 2/1988
(Continued)

OTHER PUBLICATIONS

Alyoshin V et al.: "Multicrystal Low-Background Gamma-Spectrometer," Nuclear Instruments & Methods in Physics Research, North-Holland Publishing Company, Amsterdam, NL, vol. 197. No. 2/3, Jun. 1, 1982, pp. 341-346, XP001440349, ISSN: 0167-5087.
(Continued)

*Primary Examiner* — David Porta
*Assistant Examiner* — Faye Boosalis
(74) *Attorney, Agent, or Firm* — Davidson, Davidson & Kappel, LLC

(57) ABSTRACT

A photonic spectrometry device is provided. The photonic spectrometry device comprises several identical spectrometers each spectrometer comprising a radiation sensor and being capable of providing a measurement spectrum corresponding to the measurements of the sensor during a time interval, the spectrometers being capable of performing measurements simultaneously on one same radiation-emitting product and of providing measurement spectra for one same time interval, and a processor capable of determining a net spectrum from each of the measurement spectra provided by the spectrometers for one same time interval, and of determining a global spectrum resulting from the summation of the net spectra determined for one same time interval.

16 Claims, 6 Drawing Sheets

(56) References Cited

U.S. PATENT DOCUMENTS

| | | |
|---|---|---|
| 4,317,033 A | 2/1982 | Panenka et al. |
| 4,918,313 A | 4/1990 | Dubail et al. |
| 5,036,200 A | 7/1991 | Dubail et al. |
| 2009/0134337 A1 | 5/2009 | Russ et al. |
| 2009/0166539 A1 | 7/2009 | Ruan et al. |

FOREIGN PATENT DOCUMENTS

| | | |
|---|---|---|
| EP | 1927995 A2 | 6/2008 |
| EP | 1956392 A1 | 8/2008 |
| EP | 2246711 A2 | 11/2010 |
| FR | 2003773 A1 | 11/1969 |
| GB | 1226924 A | 3/1971 |
| GB | 2460159 A | 11/2009 |
| JP | S56-168579 A | 12/1981 |
| JP | S59-200998 A | 11/1984 |
| JP | H06-308058 A | 11/1994 |
| JP | H07-140252 A | 6/1995 |
| JP | A2008-134121 | 6/2008 |

OTHER PUBLICATIONS

Yin Jing-Peng et al.: "The Discussion on Synthesis Method of Array Nai(Ti) Detector y-Ray Spectrum," 2009 (See English Abstract on p. 5-7).

Lin Lianqing et al.: "A Nai (Ti)—Plastic Anticoincidence Shield Low-Background Gamma Spectrometer," Radiation Protection, vol. 3. No. 5, Sep. 1983 (See English Abstract on last page).

Guangxi Wang et al.: 2006, pp. 12-36 (See English Abstract on third page).

Guangxi Wang et al.: 2006, p. 191 and English translation thereof.

PHOTONIC SPECTROMETRY DEVICE AND METHOD, METHOD FOR CALIBRATING THE DEVICE, AND USE OF THE DEVICE

The present invention relates to the field of photon spectrometry.

BACKGROUND

The production or recycling of nuclear fuel leads to the production of by-products, waste or effluent. It must be verified that the content of radioactive materials in these by-products, waste and effluent is acceptable with regard to regulatory thresholds.

For example, uranium oxide (UxOy) and in particular uranium dioxide (UO2) is used as nuclear fuel. Uranium oxide is obtained for example by conversion of uranium hexafluoride ($UF_6$) to uranium oxide. Conversion is conducted in a furnace for example by counter-current circulation of a powder of uranium hexafluoride and water ($H_2O$). Said manufacturing process is described in FR 2 771 725.

This conversion generates hydrofluoric acid (HF) as recyclable by-product. It must be controlled that the concentration of uranium in the hydrofluoric acid does not exceed the regulatory thresholds laid down by the nuclear safety agency.

To do so, it is possible regularly to take samples and to have them analysed by a laboratory, for example using mass spectrometers, molecular absorption spectrophotometers . . . .

Nevertheless, such analyses require the use by qualified personnel of sophisticated laboratory equipment that is costly to purchase, maintain and operate. They require a time possibly varying from several tens of minutes to a day depending on the necessary preparations and the type of measurement to be performed. They are conducted at regular time intervals but spaced apart. These analyses are ill-adapted to the monitoring of a continuous industrial process and in this case necessitate intermediate storage and treatment in batches at certain steps of the industrial process.

SUMMARY OF THE INVENTION

It is one objective of the invention to propose a photonic spectrometry device adapted for the monitoring of industrial processes.

For this purpose a photonic spectrometry device is provided comprising several identical photonic spectrometers, each spectrometer comprising a radiation sensor and being capable of providing a measurement spectrum corresponding to the measurements of the sensor during a time interval, the spectrometers being capable of performing measurements simultaneously on one same radiation-emitting product and of providing measurement spectra for one same time interval, and processing means capable of determining a net spectrum from each of the measurement spectra provided by the spectrometers during one same time interval and of determining a global spectrum resulting from the summation of the net spectra determined for one same time interval.

According to other embodiments, the photonic spectrometry device comprises one or more of the following characteristics taken alone or in any possible technical combination:

each spectrometer comprises a detection module capable of converting an electric signal emitted by the sensor on detection of a photon and proportional to the energy of the detected photon, to a digital signal representing the energy of the detected photon;

each detection module is adjustable so as to adjust the digital signal output by the detection module as a function of the signal emitted by the associated sensor;

each spectrometer is initially adjusted by calibrating the detection module so that the sensor/detection module pairs of the spectrometers emit substantially the same digital signal in the presence of one same source of radiation;

at least one calibration source emitting radiation, common to the spectrometers, each sensor of the spectrometers statistically receiving substantially one same quantity of photons from the or from each calibration source for one same time interval;

the sensors of the spectrometers are arranged in a circle;

the sensors are regularly distributed around the circle;

at least two different calibration sources common to the spectrometers;

two calibration sources having respective reference spectral lines located either side of a characteristic spectral line of an element to be detected, in particular either side of a spectral line characteristic of uranium 235;

the processing means are capable of determining each net spectrum by aligning each measurement spectrum in relation to a spectral line of the measurement spectrum corresponding to the or to each calibration source, and in relation to a reference line of the or of each calibration source;

the photonic spectrometer device is adapted for the measurement of gamma-rays or the measurement of X-rays.

A photonic spectrometry method is also provided comprising the steps of:

providing measurement spectra using identical spectrometers, each measurement spectrum resulting from measurements performed on one same radiation-emitting product during one same time interval by a respective spectrometer;

determining a net spectrum from each measurement spectrum;

determining a global spectrum resulting from the summation of the net spectra.

According to one embodiment, each net spectrum is determined by aligning the measurement spectrum provided by a spectrometer in relation to a spectral line of the measurement spectrum corresponding to at least one calibration source and in relation to the reference line of the or of each standard source.

A method for calibrating a photonic spectrometry device is also provided comprising the step to adjust a detection module capable of converting an electric signal output by the sensor of each spectrometer to a digital signal representing the energy of each detected photon so that the spectrometers provide substantially identical spectra in the presence of one same source of radiation.

A use of a photonic spectrometry device is also provided such as defined above to measure the uranium content of hydrofluoric acid resulting from the production of uranium oxide, to measure the content of at least one radio-isotope in effluent from a plant recycling radioactive materials, or to measure before discharge the content of at least one radio-isotope in the effluent of a plant for the treatment of radioactive material.

BRIEF SUMMARY OF THE DRAWINGS

The invention and its advantages will be better understood on reading the following description given solely as an example and with reference to the appended drawings in which.

DETAILED DESCRIPTION

Figure 1:
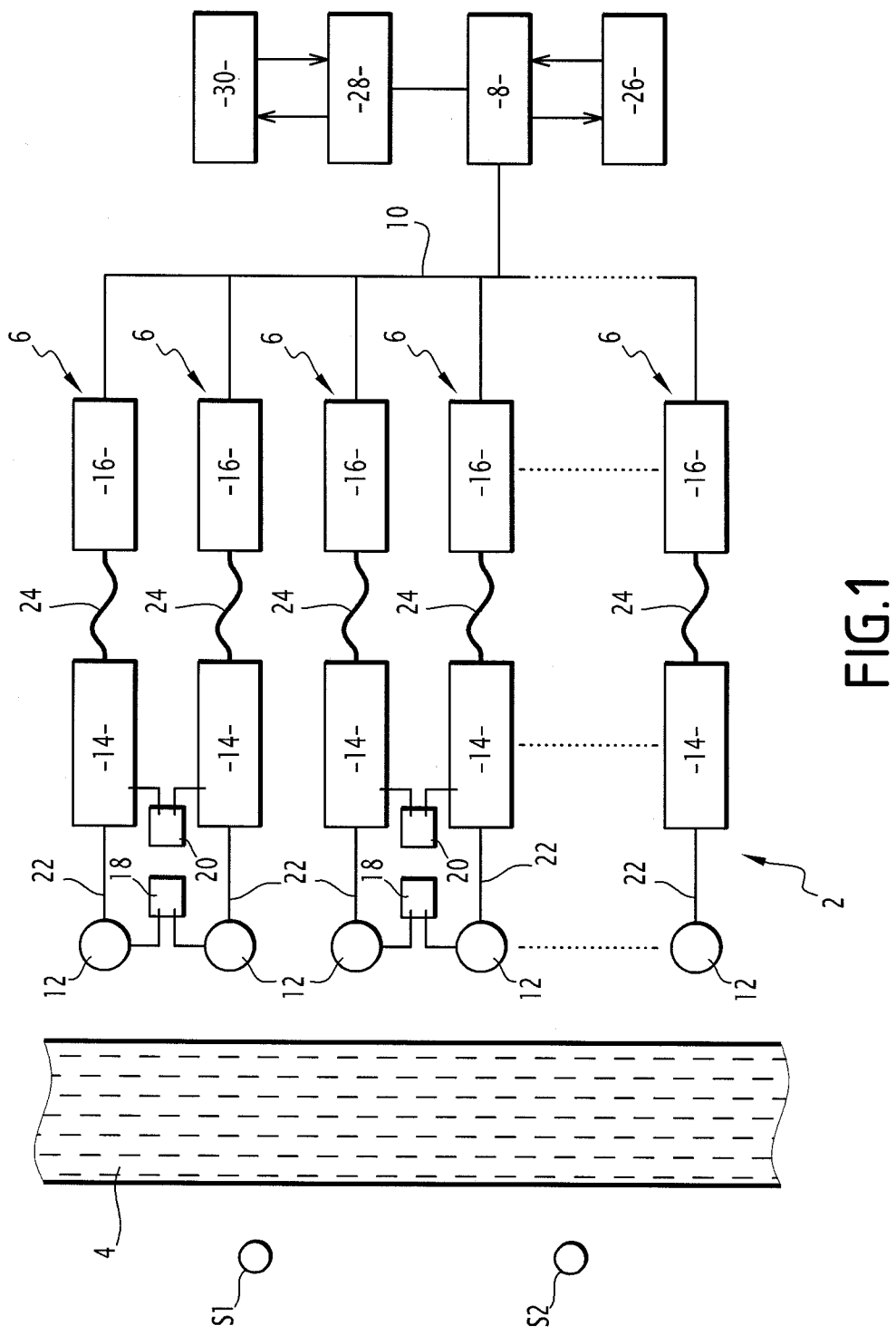
FIG. 1 is a schematic view illustrating a photonic spectrometry device according to an embodiment of the invention.

The photonic spectrometry device 2 illustrated in FIG. 1 is capable of measuring radiation emitted by a product 4.

The photonic spectrometry device 2 comprises several photon spectrometers 6 and an electronic processing module 8, hereinafter <<processing module>>. The photonic spectrometry device 2 comprises a data exchange bus 10 connecting the processing module 8 to the output of each spectrometer 6.

Each spectrometer 6 is capable of producing a spectrum of the number of photons detected during a time interval or measurement interval as a function of the energy of the detected photons. Each spectrometer 6 is designed to ensure the linearity of its response (energy spectrum) in relation to its input data (energy of each photon).

Each spectrometer 6 comprises a single radiation sensor 12 and an associated electronic detection and quantification module 14, hereinafter <<detection module>>, and associated electronic analysis module 16 hereinafter <<analysis module>>.

The sensor 12 is capable of detecting gamma photons also called gamma-rays and/or X photons also called X-rays and, for each detected photon, of emitting an electric output signal proportional to the energy of the detected photon. The sensor 12 is electrically powered by a high voltage electric energy source 18.

The detection module 14 on its input receives the output signal of the associated sensor 12 and outputs a digital signal representing the value of the energy of each photon detected by the sensor 12. The detection module 14 is electrically powered by a low voltage electric energy source 20.

The analysis module 16 is capable of counting the signals emitted by the detection module 14, each signal corresponding to a photon detected by the sensor 12, and of producing a measurement spectrum of the quantity of photons detected by the sensor 12 as a function of energy (keV) over a measurement interval.

The sensor 12, the detection module 14 and the analysis module 16 are separate and connected together by data transmission links. The sensor 12 outputs an electric signal. The input of the detection module 14 is connected to the output of the sensor 12 via a wire link 22. The detection module 14 emits an optical digital output signal. The input of the analysis module 16 is connected to the output of the detection module 14 via an optical link 24 typically an optical fibre.

The spectrometers 6 are capable of operating simultaneously and of simultaneously processing the photons emitted by the product 4.

The processing module 8 is connected to the output of each spectrometer 6 by the bus 10. The processing module 8 is configured to perform specific processing of the measurement spectra acquired simultaneously during the same time interval and produced by the spectrometers 6 so that it is possible to deliver a representative global spectrum determined from all the measurement spectra.

The processing module 8 is connected to a man/machine interface 26 to display results and/or receive instructions.

The processing module 8 is connected to a driver unit 28 capable of using the result given by the processing module 8 to drive a plant 30, e.g. a plant for producing or recycling nuclear fuel or an installation to evacuate effluent from a plant producing and/or recycling nuclear fuel.

The spectrometers 6 are identical. The sensors 12 of the spectrometers 6 are identical, the detection modules 14 of the spectrometers 6 are identical and the analysis modules 16 of the spectrometers 6 are identical.

Figure 2:
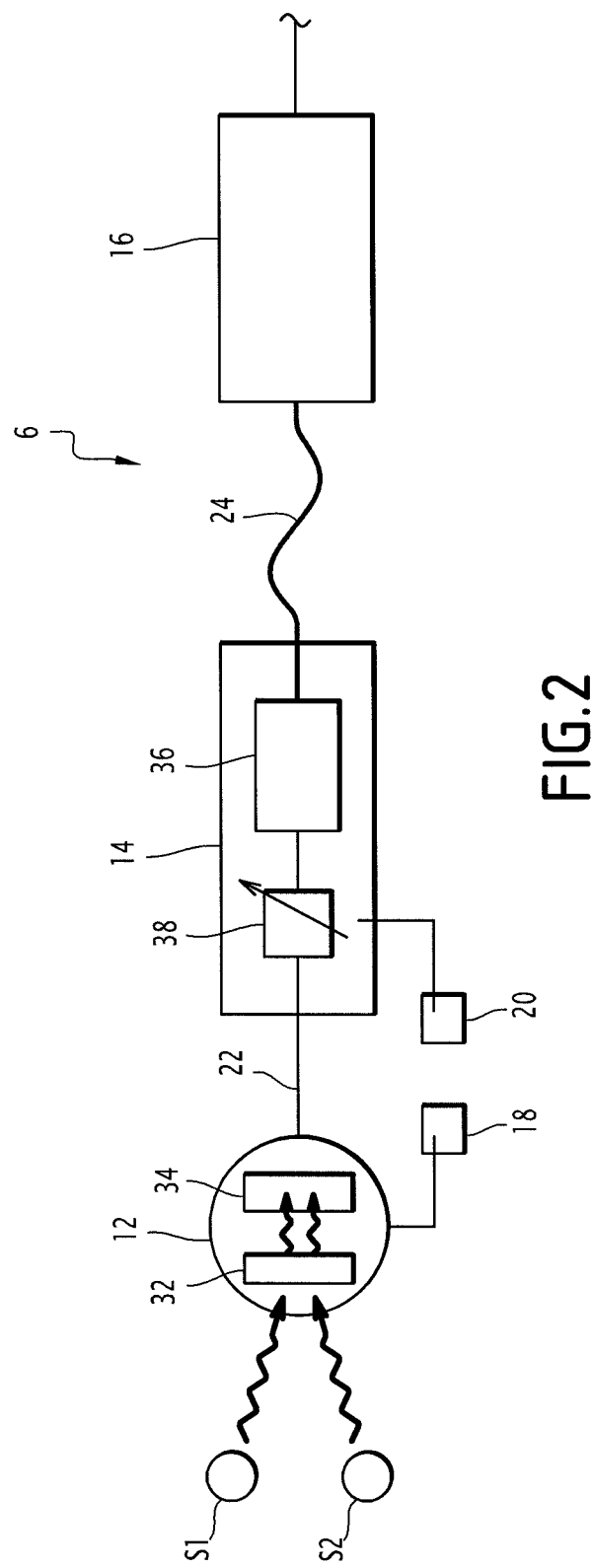
FIG. 2 is a schematic view of a photon spectrometer of the photonic spectrometry device shown in FIG. 1.

As shown in FIG. 2 illustrating a spectrometer 6, the sensor 12 of each spectrometer 6 is a scintillation sensor. It comprises a scintillator crystal 32 e.g. an inorganic scintillator of doped alkali halide type such as NaI(T1) for example or of mineral compound type such as $LaBr_3(Ce)$, and a photomultiplier 34 optically coupled to the crystal 32. When a photon is absorbed by the crystal 32, the latter emits a light signal whose energy is proportional to the energy of the absorbed photon. The photomultiplier 34 outputs an electric signal proportional to the light energy emitted by the crystal 32.

The sensor 12 therefore outputs an analogue electric signal proportional to the energy released by the photon in the crystal 32.

The detection module 14 comprises an analogue/digital converter 36 to convert the analogue input signal to a digital output signal.

The detection module 14 is adjustable so as to adjust the signal output by the detection module 14 in relation to the input signal it receives. To do so the detection module 14 comprises a proportional controller 38 capable of applying a multiplication coefficient to the signal it receives. The proportional controller 38 is adjustable so that it is possible to adjust the multiplication coefficient.

Returning to FIG. 1, the photonic spectrometry device 2 comprises at least one calibration source and preferably at least two calibration sources S1, S2 associated with the plurality of spectrometers 6. Each calibration source S1, S2 emits a determined spectrum of photons. The calibration sources S1, S2 emit different photon spectra. Preferably, each calibration source S1, S2 emits a spectrum having a characteristic spectral line around a reference energy or reference line and the calibration sources S1, S2 have one or more reference lines at different reference energies.

The calibration sources S1, S2 are arranged so as to ensure identical irradiation of each sensor 12 of each spectrometer 6. For example, to ensure identical irradiation, each calibration source S1, S2 is arranged equidistant from the sensors 12 of the spectrometers 6. In other words, the spectrometers 6 use at least one common calibration source S1, S2, preferably two common calibration sources S1, S2.

The calibration sources S1, S2 are separate from the spectrometers 6 and in particular from the sensor 12 of each spectrometer 6. Each spectrometer 6 is therefore associated with at least one calibration source S1, S2 separate from the sensor 12 of this spectrometer 6, preferably with two calibration sources S1, S2 separate from the sensor 12 of this spectrometer 6.

The processing module 8 is capable of individually analysing each measurement spectrum during a given measurement interval so as to compare, for each spectrometer 6, the measured characteristic spectral line corresponding to each calibration source S1, S2 with the corresponding reference line, of calculating the affine function constants to be applied to cause the coinciding of the measured characteristic spectral lines of the sources S1, S2 with their reference lines, of applying the affine functions to every point of the spectral domain to align the measurement spectrum and thereby determine a corresponding net spectrum, and finally of summing the net spectrum derived from each of the spectrometers 6 to obtain the global spectrum.

Alignment is energy-based and/or efficacy-based. Energy alignment consists of determining an affine function to cause the energy of the measured characteristic spectral line corresponding to the or each calibration source S1 and S2 to coincide with the energy of the reference line of the or of each calibration source S1, S2. Efficacy-based alignment consists of determining an affine function to cause the number of detected photons of the measured characteristic spectral line corresponding to the or to each calibration source S1 et S2 to coincide with the expected number of photons—i.e. the initial detection efficacy of the sensor 12 of the Spectrometer 6 concerned—during the measurement interval.

The processing module 8 receiving the measurement spectra and/or the analysis module 16 producing the measurement spectra is/are advantageously capable of storing these at least temporarily. This makes it possible to consult the measurement spectra for qualification purposes for example or for a control in the event of an anomaly or operating incident.

Processing means are formed by the processing module 8 capable of determining a net spectrum from each of the measurement spectra provided by the spectrometers 6 and of determining a global spectrum resulting from summation of the net spectra.

In one variant, the analysis module 16 of each spectrometer 6 is capable of determining the measurement spectrum and of performing the processing thereof to determine the corresponding net spectrum. In this case, the processing means are formed by the analysis module 16 of each spectrometer 6 and by the processing module 8 which receives the net spectra determined by the analysis modules 16 and performs summation thereof to obtain the global spectrum.

Figure 3:
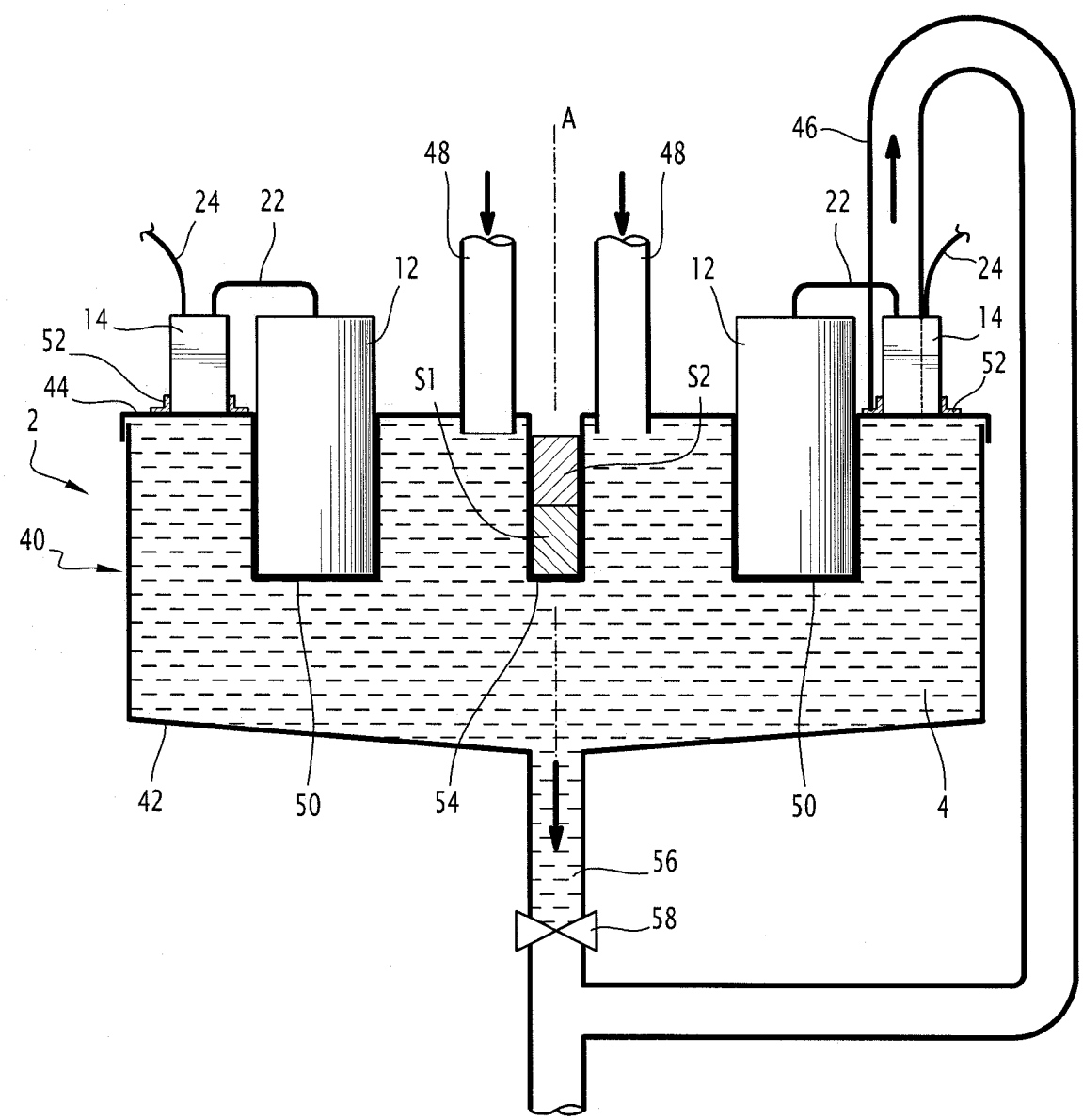
FIGS. 3 and 4 are cross-sectional and overhead views of a detection assembly of the device in FIG. 1.
Figure 4:
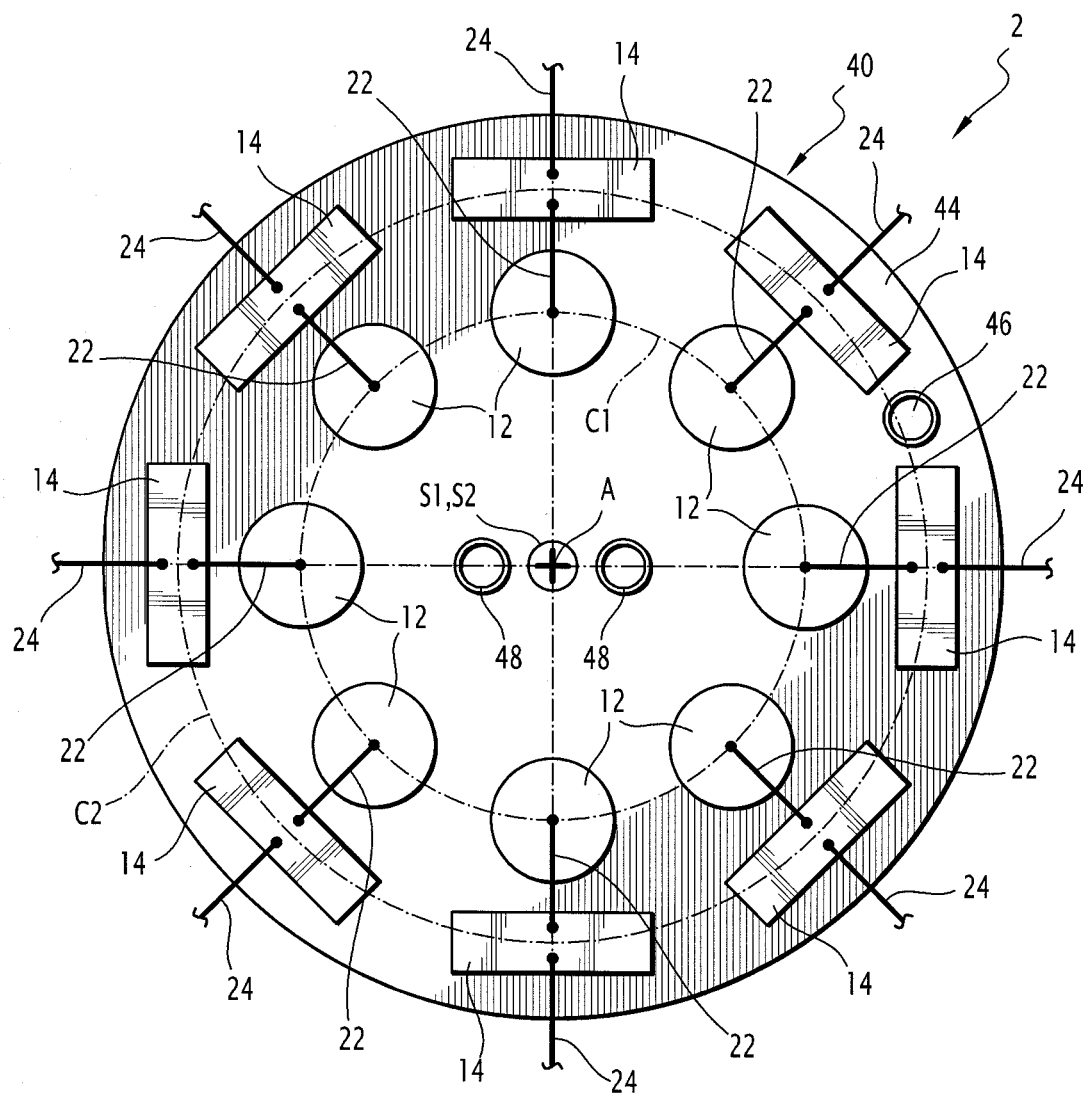

As illustrated in FIGS. 3 and 4, the sensors 12 are regularly distributed over an imaginary circle of sensors C1 centred on an axis of symmetry A. As illustrated in FIG. 4, the sensors 12 total a number of 8 and are distributed around the axis A, with the same metric radius value and at a regular angular pitch of 45°.

The calibration sources S1, S2 are arranged at the centre of the circle of sensor C1. Each calibration source S1, S2 therefore lies equidistant from the sensors 12. As a result each sensor 12 statistically receives substantially the same quantity of photons derived from the calibration sources S1, S2, during one same measurement interval.

The photonic spectrometric device 2 comprises a chamber 40 for circulation of the product 4 to be controlled, having symmetry of revolution about the axis of symmetry A. Therefore each sensor 12 statistically receives substantially the same quantity of photons derived from the product 4 present in the chamber 40.

The sensors 12 are arranged on the chamber 40 so that space receiving the product 4 in the chamber 40 lies between the sensors 12 and around the sensors 12. This ensures good irradiation of the sensors 12 by the photons emitted by the product 4.

As illustrated in FIGS. 3 and 4, the chamber 40 comprises a tank 42 of circular cross-section extending along the axis of symmetry A, and a lid 44 of circular contour hermetically sealing the tank 42 if necessary.

The lid 44 is of general circular shape. The lid 44 comprises at least one filling device 48 arranged close to the centre of the lid 44 coinciding with the axis A and ensuring rapid filling of the chamber 40 and at least one discharge device 46 positioned on the periphery of the lid 44 and ensuring evacuation of the overflow of the pot 40. As illustrated in FIGS. 3 and 4 when several filling devices 48 are present, the filling devices 48 are spaced apart and regularly distributed in a circle centred on the axis A. Depending on the configuration of the plant 30 the filling device 48 may also be arranged on a side face or the inner face of the tank 42.

The tank 42 comprises at least one drainage device 56 which is fed at the lowest point of the tank 42 and ensures the draining of the pot 40 controlled by an evacuation valve 58. As illustrated in FIG. 3, the tank 42 comprises a drainage device 56 located at the centre of the bottom of the tank.

The lid 44 comprises a plurality of sensor alveoli 50 projecting inside the chamber 40 and open towards the outside of the chamber 40. Each sensor alveolus 50 defines a housing in the lid 44 to receive a sensor 12. The sensor alveoli 50 are arranged following the circle of sensors C1. The sensor alveoli 50 are distributed at a regular angle about the axis A.

The lid 44 comprises a plurality of retaining devices 52 for the detection modules 14 and opening towards the outside of the chamber 40. Each retaining device 52 by projecting on the outside of the lid 44 defines a housing to receive a detection module 14. The retaining devices 52 are arranged in an imaginary circle of detection modules C2 centred on the axis A. The retaining devices 52 are distributed at regular angle about the axis A.

The lid 44 comprises an alveolus 54 for calibration source centred on the axis A. The calibration source alveolus 54 is arranged between the filling devices 48. The calibration sources S1, S2 are arranged in the calibration source alveolus 54. Each calibration source S1, S2 lies in the centre of the circle of sensors C1 around which the sensors 12 are arranged.

The chamber 40 is arranged in the vicinity of a plant 30. The detection assembly formed by the measuring chamber 40, the sensors 12 and their associated detection modules 14 is fed with product 4 to be controlled via a direct line or branch line (parallel line) of the plant 30.

The chamber 40 is arranged for example at the output of a furnace producing uranium and hydrofluoric acid, on an output of liquid hydrofluoric acid, in a confined room.

The detection modules 14 arranged in the vicinity of the sensors 12 allow the use of short wire links 22 between the detection modules 14 and the sensors 12, to maximize the signal-to-noise ratio during detection.

The analysis modules 16 associated with the detection modules 14 and with the sensors 12 can be placed outside the confined room. The optical link 24 via optical fibre ensures the transmission of data at a fast rate and reliably over long distances for example over several tens of meters.

When in operation, during a determined time interval, the spectrometers 6 simultaneously measure the photons emitted by the product 4 present in the measuring chamber. Each spectrometer 6 provides a measurement spectrum. After individual alignment of each measurement spectrum to determine a net spectrum, the processing module 8 adds the net spectra to determine a global spectrum resulting from summation of the net spectra. On the basis of the global spectrum the processing module 8 determines one or more measurements, for example a concentration of uranium 235 in the product 4.

The photonic spectrometry device 2 allows a measurement performed by laboratory equipment on a sample of product 4 over a period of time T, to be replaced by n simultaneous measurements (n>1) on the product 4 at the output of a plant 30 and performed by several spectrometers 6 whilst guaranteeing a result of same statistical accuracy acquired over a shorter time period possibly being reduced to T/n.

The photonic spectrometry device 2 allows satisfactory measurements to be performed over a measurement interval of a few minutes e.g. 1 to 5 minutes, whereas conventional sampling and analysis techniques using laboratory equipment require several tens of minutes even several hours and also, depending on the product to be sampled, action by a human operator in a possibly hazardous area such as a confined area.

The photonic spectrometry device 2 therefore allows measurements to be performed very rapidly over a measurement interval compatible with the monitoring of an industrial process or the driving of an industrial process.

Nonetheless, spectrometry is measurement of statistical type. Not all the photons emitted by the product 4 during the measurement interval are necessarily detected. Each sensor 12 only detects part of the photons which reach the sensor 12.

The principle of the adding of measurements provided by different spectrometers 6 can only be considered to be physically justified if the photonic spectrometry device 2 verifies the principle of ergodicity.

In practice this means that it must be possible for the different measuring pathways of one same magnitude to be considered as identical or substantially identical so as to provide identical or sufficiently identical results under the same measuring conditions.

To meet this condition or at least to be sufficiently close to meeting this condition, the photonic spectrometry device 2 comprises several identical spectrometers 6.

In practice owing to unavoidable manufacturing tolerances, although the sensors 12 are identical they have manufacturing dispersion and when placed under the same conditions give different measurements.

The value of the signals output by a sensor 12 also depends on its high voltage supply. A modification however small in relative value of this high voltage supply substantially modifies the value of the signals produced. The adjustment of this voltage individually for each sensor 12 could in theory allow calibration of the sensors 12, but this individual adjustment requires a specific high voltage electric energy source 18 per sensor 12 and is not industrial on account of the high maintenance involved. To meet the constraints of an industrial process it is preferable to maintain a single high voltage value, which could allow the use a single high voltage electric energy source 18 for all the sensors 12. All the sensors 12 being powered by the same high voltage value, the output signals will then be different through the differences in gain and detection yield of each sensor 12.

According to one aspect of the invention, the sensor 12 of each spectrometer 6 is coupled to the detection module 14 associated with this spectrometer 6. The sensor 12 and the associated detection module 14 are jointly calibrated.

According to one embodiment, the detection module 14 of each spectrometer 6 is initially adjusted so that the signals given by the different sensor 12/detection module 14 pairs are identical and linear or substantially identical and linear under the same measuring conditions.

Advantageously each sensor 12/detection module 14 pair is adjusted by adjusting the gain of the photomultiplier 34 coupled to the crystal 32 of the sensor 12, then by adjusting the detection module 14 for example by adjusting the proportional controller 38 of the detection module 14.

Therefore, according to this embodiment of the invention, adjustment is performed at each sensor 12/detection module 14 pair and not at each sensor 12. This makes it possible to take into account the dispersion between sensors 12 and between detection modules 14 and to ensure that each spectrometer 6 produces substantially the same net spectrum in the presence of one same radiation source.

The initial adjustment of each spectrometer 6 is conducted for example in the presence of at least one calibration source S1, S2. The proportional controller 38 of the detection module 14 is adjusted so that the output signals from the detection module 14 correspond to the expected values in the presence of the calibration source S1, S2.

As a result each sensor 12 and the detection module 14 associated therewith form an inseparable pair. Two detection modules 14 cannot be changed over without changing over the two associated sensors 12, and a sensor 12 cannot be replaced without associating its own detection module 14 together with it.

The sensors 12 are powered by the same high voltage value and are advantageously powered by the same high voltage electric energy source 18. This simplified powering of the sensors 12 and maintenance operations. For other reasons such as the principle or redundancy used in nuclear plants as illustrated in FIG. 1, it is possible to provide a high voltage electric energy source 18 that is common to two sensors 12 for example. In FIG. 1 the spectrometers 6 are grouped in pairs, the two sensors 12 of the spectrometers 6 of each group being powered by the same high voltage electric energy source 18.

Each sensor 12 may drift over time and the sensors 12 may have different drifts.

According to one aspect of the invention, the photonic spectrometry device 2 comprises at least one calibration source S1, S2 common to the different spectrometers 6 to correct the drift of the sensors 12. The sensors 12 are arranged symmetrically around each calibration source S1, S2. Therefore the correction of the drift of the sensors 12 is conducted from the same calibration source S1, S2 thereby providing an additional guarantee for heed of the principle of ergodicity.

The drift of each sensor 12 is corrected by alignment of each measurement spectrum in relation to the measured characteristic spectral line corresponding to the or to each calibration source S1, S2 and in relation to the reference line of the or of each calibration source S1, S2 so as to determine a net spectrum of radiation emitted by the product 4 and by the or each calibration source S1, S2.

According to one aspect of the invention, the photonic spectrometry device 2 comprises at least one calibration source S1 having a reference energy higher than that of an element to be detected.

Uranium isotope 235 inter alia has a characteristic gamma photon emission at a value of 185.7 keV. A photonic spectrometry device 2 adapted to the detection of uranium isotope 235 may comprise a caesium 137 calibration source for example, having a reference characteristic gamma photon emission at a value of 662 keV whose influence on counts at the energy of 185.7 keV, i.e. counting results over the measurement interval output by the analysis module 16, is easily made negligible.

By ensuring that each spectrometric pathway has a characteristic of response linearity, it is possible to correct the measurement spectrum as a function of the difference between the measured value for a calibration source and the reference value of the calibration source. An error—in relative value—of X % in the measurement of the reference value of the calibration source leads to a correction—in relative value—of X % of all measured values.

As a result a small drift in measurement in absolute value of the reference energy of a calibration source leads to a greater correction in absolute value of all energy measurements higher than that of the calibration source and a smaller correction in absolute value of all energy measurements lower than that of the calibration source. This means that for a given measurement uncertainty, uncertainty is higher for all energy measurements higher than that of the calibration source and lower for all energy measurements lower than that of the calibration source.

The choice of an energy calibration source higher than the energy of an element to be detected therefore allows the minimising of measurement uncertainties in absolute value over the energy ranges corresponding to that of the element to be detected.

According to one aspect of the invention the photonic spectrometry device 2 comprises two calibration sources S1 and S2 having characteristic spectral lines with different reference energies.

Preferably the reference energies of the calibration sources S1 and S2 are chosen so as to have an emission energy which lies at one of the two ends of the spectral energy analysis band of one spectrometer 6 for one thereof, and for the other at the other end of the spectral energy analysis band of the same spectrometer 6. Therefore with two sources providing two different energies and the most distant apart possible over the spectral analysis range, correction is optimal for all the detectable photons on this energy analysis band.

Uranium isotope 235 inter alia has a characteristic gamma photon emission at a value of 185.7 keV. A photonic spectrometry device 2 adapted for the detection of uranium 235 comprises a calibration source in americium 241 for example having a reference energy of 59.5 keV and hence a spectral reference energy line around abscissa 60 keV and a calibration source in caesium 137 having a reference energy of 662 keV and hence a spectral reference energy line around abscissa 662 keV.

Figure 5:
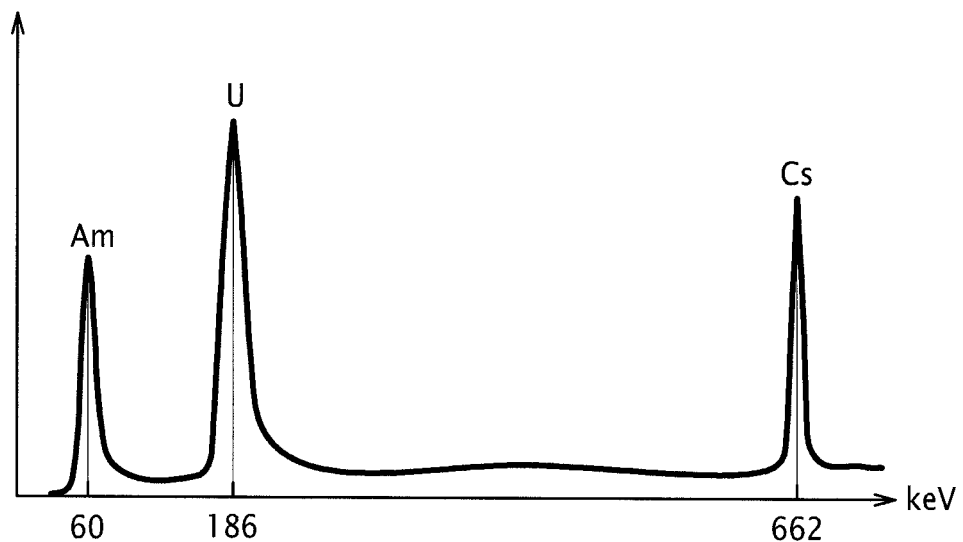
FIG. 5 is a diagram illustrating a spectrum obtained using a spectrometer of the photonic spectrometry device in FIG. 1.

FIG. 5 illustrates one example of a spectrum able to be obtained in the presence of an americium 241 calibration source, a caesium 137 calibration source and a sample containing uranium 235. The abscissa represents the energy in keV of the received photons and the ordinate the number of detected photons.

The correction of drift is made by correcting each measurement spectrum as a function of the measured characteristic spectral line and of the reference line of each calibration source S1, S2, which guarantees more precise correction.

The affine functions for alignment are determined so that the measured characteristic lines of the calibration sources S1, S2 used coincide, in energy and count, with the respective reference lines of the calibration sources S1, S2 and are then applied to each point of the measurement spectrum.

Most photon sensors comprise a calibration source—e.g. americium 241—placed in the sealed sensor and even sealed to the crystal at the time of manufacture. Subjected to regulations on sealed sources, the calibration sources have a limited regulatory lifetime. The source and hence the sensor must be destroyed at the end of the regulatory lifetime irrespective of the state of the sensor, which limits the lifetime of the sensor. Similarly if a sensor is faulty, the whole sensor is replaced and the calibration source is destroyed with the sensor.

The use of a calibration source associated with a sensor but physically separate from the sensor therefore allows the limiting of operating costs of the assembly by limiting the cost of replacement of a sensor and allowing the sensor to be preserved even if the calibration source must be replaced and vice versa. Additionally, this allows the use of one same calibration source for several sensors, which not only allows limiting of the cost of the measuring assembly but also ensures better suitability with the constraint of ergodicity of a device using several sensors simultaneously.

In one embodiment, at least one alignment function to align the measurement spectra of a spectrometer 6 is determined for each measurement spectrum determined by the spectrometer 6. As a variant, at least one alignment function to align the measurement spectra of a spectrometer 6 is determined from at least one reference measurement spectrum of the spectrometer 6 so as to cause the coinciding, for each calibration source S1, S2, of a characteristic spectral line of the reference measurement spectrum with the reference spectral line of this calibration source S1, S2. The, or each, alignment function is used to align several successive measurement spectra of the spectrometer 6. The, or each, alignment function is periodically determined at a periodicity dependent on the stability of the spectrometer 6. The periodicity may be in the order of one day, one week or more.

Figure 6:
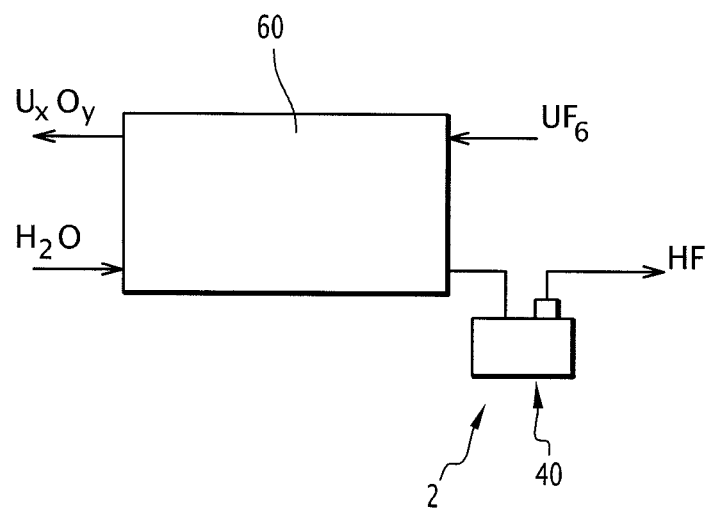
FIGS. 6 to 8 are schematic views of plants for producing or recycling nuclear fuel incorporating a photonic spectrometry device according to embodiments of the invention.
Figure 7:
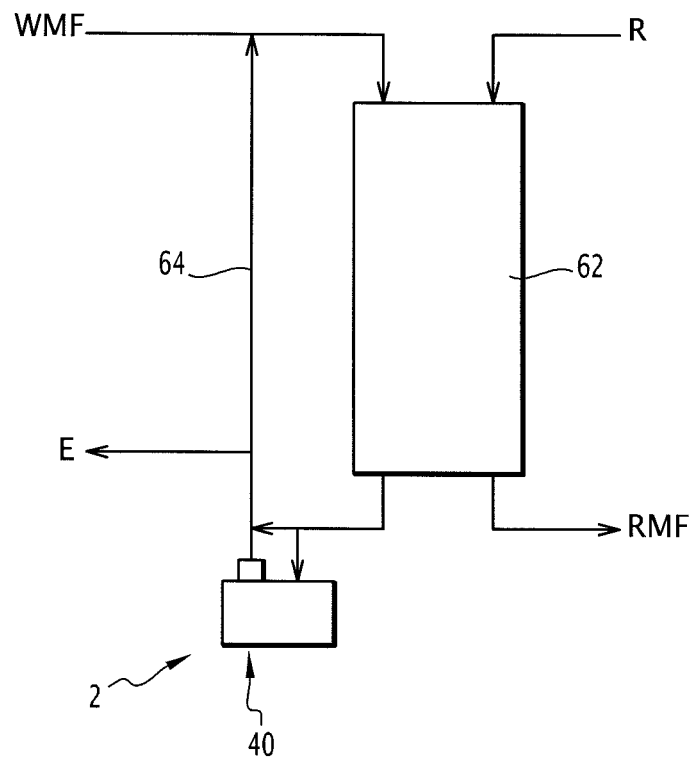
Figure 8:
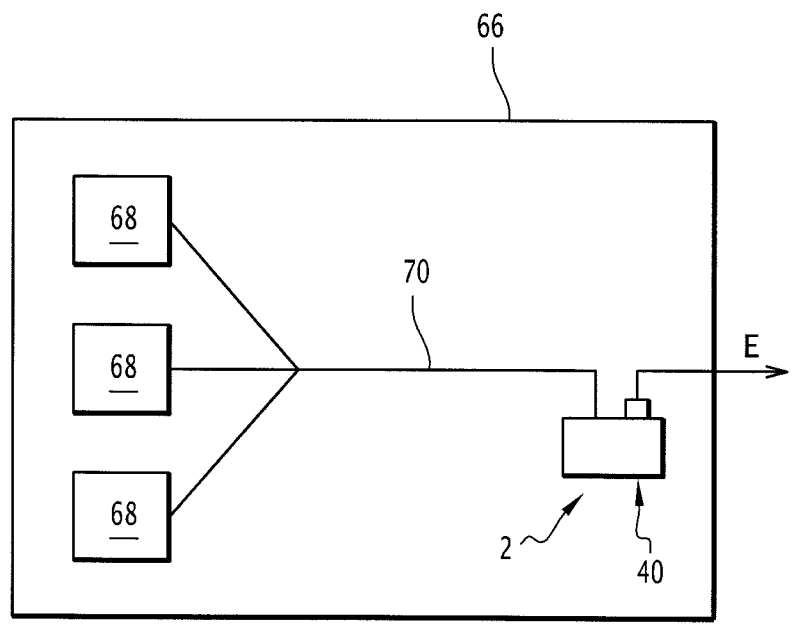

FIGS. 6 to 8 schematically illustrate industrial plants 30 using a photonic spectrometry device 2 to control the radio-isotope content of by-products and discharged effluent.

FIG. 6 illustrates a plant for the conversion of uranium hexafluoride to uranium oxide comprising a furnace 60 receiving inter alia an input of uranium hexafluoride $UF_6$ and water $H_2O$ circulating in counter-current in the furnace 60, and outputting uranium oxide $U_xO_y$ as product and hydrofluoric acid HF as by-product.

As illustrated the chamber 40 of the photonic spectrometry device 2 is arranged in series on the hydrofluoric acid output after condensation to liquid HF to verify that the uranium 235 content of the hydrofluoric acid is lower than regulatory thresholds.

FIG. 7 illustrates a recycling plant of radioactive materials comprising a reactor 62 into which waste is input containing radioactive material WMF and reagents R able to precipitate the radioactive material, and which outputs recycled radioactive material RMF and effluent E.

As illustrated the chamber 40 of the photonic spectrometry device 2 is arranged as a branch line (in parallel) on an effluent output E to verify that the radio-isotope content of the effluent E e.g. some radio-isotopes of thorium, uranium 235, lead 212, . . . , or other radioactive impurities derived for example from the use of uranium derived from the processing of irradiated fuel called reprocessed uranium, plutonium . . . is lower than regulatory thresholds.

The recycling plant comprises a recirculation pipe 64 extending between the output of the measuring chamber 40 of the photonic spectrometry device 2 and the waste input WMF so that the effluent E is recycled for as long as its content of one or more radio-isotopes is too high.

FIG. 8 illustrates an assembly 66 for treating radioactive materials 66 comprising several treatment plants 68 of radioactive materials producing effluent E collected in an evacuation circuit for discharge thereof.

The photonic spectrometry device 2 is arranged in the discharge circuit to verify that the radio-isotope content of the collected effluent E conforms to regulatory discharge thresholds.

The photonic spectrometry device 2 is installed in a main pipe 70 to perform measurements on all the effluent E or on a branch pipe to perform measurements on a fraction of the collected effluent E.

It is possible to use the photonic spectrometry device 2 so as to determine the origin of effluent pollution with radioactive material. In relation to the industrial process from which pollution e.g. uranium originates, chemical elements characteristic of the process used may be associated with uranium.

For example the presence of lead 212 in association with uranium 235 is the sign of pollution derived from a plant using reprocessed uranium.

Therefore according to one aspect of the invention, the processing module 8 of the photonic spectrometry device 2 is configured to determine, from the global spectrum, the presence of additional radio-isotopes e.g. uranium 235.

In general the choice of the use of the photonic spectrometry device 2 in series or in parallel on the output of the product 4 to be controlled is dependent on the plant 30 and on the flow rate of the product on the output line.

According to one option, the processing module 8 comprises a memory in which reference spectra are stored characteristic of some types of pollution, and is configured for example to emit an alert or trigger stoppage of the plant 30 in the event that a net spectrum corresponds to a pre-recorded reference spectrum.

With the invention it is possible to perform rapid measurements of gamma- and/or X-rays compatible with the monitoring or driving of industrial processes. The photonic spectrometry device can be built from commercially available parts and can be positioned in situ in the vicinity of or within a plant to control the products output by this plant and/or to drive the plant.

The invention may particularly apply to the measurement of uranium 235 content at the output of processes for the manufacture of uranium-based nuclear fuel, or of uranium recycling processes. In general, the invention applies to the measurement of the content of any radioactive element.

The invention can be applied to any gamma-ray or X-ray measurement. The spectrometers of the invention are gamma- and/or X-ray photon spectrometers depending on the scintillator used.

What is claimed is:

1. A photonic spectrometry device comprising:
    several identical photon spectrometers, each spectrometer comprising a radiation sensor and being configured for providing a measurement spectrum corresponding to the measurements of the sensor during a time interval, the spectrometers being configured for performing measurements simultaneously on one same radiation-emitting product and of providing measurement spectra for one same time interval; and
    a processor configured for determining a net spectrum from each of the measurement spectra provided by the spectrometers in one same time interval, by aligning the measurement spectrum provided by each spectrometer in relation to a spectral line of a measurement spectrum of the spectrometer corresponding to at least one calibration source, and in relation to a reference line of the or of each calibration source, and of determining a global spectrum resulting from the summation of the net spectra determined for one same time interval.

2. The photonic spectrometry device as recited in claim 1 wherein each spectrometer comprises a detection module configured for converting an electric signal emitted by the sensor on detection of a photon and proportional to the energy of the detected photon, to a digital signal representing the energy of the detected photon.

3. The photonic spectrometry device as recited in claim 2 wherein each detection module is adjustable so as to adjust the digital signal provided by the detection module detection as a function of the signal emitted by the associated sensor.

4. The photonic spectrometry device as recited in claim 3 wherein each spectrometer is initially adjusted by calibrating the detection module such that the sensor/detection module pairs of the spectrometers emit substantially the same digital signal in the presence of one same radiation source.

5. The photonic spectrometry device as recited in claim 1 further comprising at least one radiation-emitting calibration source common to the spectrometers, each sensor of the spectrometers statistically receiving substantially one same quantity of photons derived from the or from each calibration source in one same time interval.

6. The photonic spectrometry device as recited in claim 5 wherein the at least one radiation-emitting calibration source common comprises at least two different calibration sources common to the spectrometers.

7. The photonic spectrometry device as recited in claim 6 wherein the at least two different calibration sources include two calibration sources having respective reference spectral lines located either side of a characteristic spectral line of an element to be detected.

8. The photonic spectrometry device as recited in claim 7 wherein the element to be detected is uranium 235.

9. The photonic spectrometry device as recited in claim 1 wherein the processor is configured for determining each net spectrum by aligning each measurement spectrum in relation to a characteristic spectral line of the measurement spectrum corresponding to the or to each calibration source and in relation to a reference line of the or of each calibration source.

10. The photonic spectrometry device as recited in claim 1 wherein the processor is configured for determining at least one alignment function to align the measurement spectra of a spectrometer using a reference measurement spectrum of the spectrometer, the or each alignment function being determined so as to cause the coinciding, for each calibration source, of a characteristic spectral line of the reference measurement spectrum with the reference spectral line of the corresponding calibration source.

11. The photonic spectrometry device as recited in claim 1 wherein the photonic spectrometry device measures gamma-rays or X-rays.

12. A method for calibrating the photonic spectrometry device as recited in claim 1, comprising the step of:
    adjusting a detection module configured for converting an electric signal output from the sensor of each spectrometer to a digital signal representing the energy of each detected photon so that the spectrometers provide substantially identical spectra in the presence of one same radiation source.

13. A method of operating the photonic spectrometry device as recited in claim 1, comprising:
    measuring, by the photonic spectrometry device, uranium 235 content of hydrofluoric acid resulting from the production of uranium oxide; measuring, by the photonic spectrometry device, the content of at least one radio-isotope in effluent from a plant recycling radioactive materials; or measuring, by the photonic spectrometry device, before discharge, the content of at least one radio-isotope in effluent from a plant treating radioactive materials.

14. A photonic spectrometry method comprising the steps of:
    providing measurement spectra using identical spectrometers, each measurement spectrum resulting from measurements performed on one same radiation-emitting product during one same time interval by a respective one of the spectrometers;
    determining a net spectrum from each measurement spectrum by aligning the measurement spectrum in relation to at least one spectral line of a measurement spectrum provided by the spectrometer, the or each spectral line corresponding to a calibration source and in relation to the reference line of the or of each calibration source; and determining a global spectrum resulting from the summation of the net spectra.

15. The method as recited in claim 14 wherein each net spectrum is determined from each measurement spectrum provided by a spectrometer by aligning the measurement spectrum in relation to a spectral line of the measurement spectrum provided by the spectrometer, the spectral line corresponding to at least one calibration source, and in relation to a reference line of the or of each calibration source.

16. The method as recited in claim 14 wherein at least one alignment function is determined for the alignment of the measurement spectra of a spectrometer from a reference measurement spectrum provided by the spectrometer, the or each alignment function being determined so as to cause the coinciding, for the or each calibration source, of a characteristic spectral line of the reference measurement spectrum with the reference spectral line of this calibration source.

* * * * *